Patented Oct. 25, 1927.

1,646,734

UNITED STATES PATENT OFFICE.

JOHN WESLEY MARDEN, OF EAST ORANGE, NEW JERSEY, ASSIGNOR TO WESTINGHOUSE LAMP COMPANY, A CORPORATION OF PENNSYLVANIA.

METALLURGICAL METHOD.

No Drawing.   Application filed August 21, 1922. Serial No. 583,375.

This invention relates to a method of extracting certain metals from their compounds and more particularly it relates to the method of reducing from their halides the metals, uranium, thorium, zirconium, titanium, vanadium, tantalum and tungsten, some of which are very difficult to produce in a condition of substantial purity.

An object of this invention is the provision of the method for the reduction and isolation of uranium, thorium, zirconium, titanium, vanadium, tantalum and tungsten.

Other objects of the invention may be perceived from a reading of the following specification.

The first step in the process of producing the above mentioned metals may consist in obtaining the oxides thereof by the ignition of pure compounds of these metals, such, for example, as the nitrate or the oxalate, which, on ignition, produce the oxides.

The ignition of compounds of the metals mentioned should be carefully performed in order to avoid the introduction of any foreign matter; for example, the compounds should be heated slowly in a clean, glazed porcelain vessel and care exercised in order to avoid contamination by silica. It should also be mentioned at this point that, throughout the entire process described herein, care should be exercised in order to obtain and maintain the desired materials free from all undesirable matter, otherwise much trouble or even failure to practice the invention may result.

From the oxides of these metals, the halides thereof should be prepared in pure form according to well known methods. Preferably, the chloride may be produced which may be done by passing dried chlorine gas over a heated mixture comprising carbon and the oxide of the metal which is to be converted to the chloride and distilling the chloride thus formed. To illustrate this step in the process and subsequent steps also, thorium will be designated as representative of the metals enumerated, except as otherwise noted. In the preparation of thorium chloride, a suitable quantity of thorium oxide may be mixed with 10% of its weight of powdered charcoal and this mixture then placed near one end of a silica tube, which, together with the charge of thorium oxide and carbon, is thoroughly dried by heating the same and passing therethrough a dry, inert gas, such, for example, as nitrogen. After the drying process is completed, that part of the tube where the charge is placed is heated to the distillation temperature of thorium chloride. Chlorine gas, which has first been dried by passing through drying agents such, for example, as sulphuric acid, calcium chloride and phosphorus pentoxide; is also passed through carbon tetra-chloride, part of the vapor of which is carried over with the chlorine into the silica tube and there aids in maintaining a reducing atmosphere. The chlorine, in contact with the mixture of charcoal and thorium oxide, converts the latter into thorium chloride when the mixture is at a bright red heat. This reaction takes place according to the following formula:

$$ThO_2 + 2C + 4Cl_2 = ThCl_4 + 2COCl_2.$$

The white thorium chloride, which is a product of the reaction, is distilled, and deposits on the cool parts of the tube or on any other cooled surface, such as a glass U tube which may be connected to the farther end of the silica tube. As previously stated, the vapor of carbon tetra-chloride passes through the tube and, by maintaining a reducing atmosphere therein, prevents the contamination of thorium chloride with oxychloride which results if the thorium chloride is exposed to the air or to moisture. It is therefore necessary to exercise all possible precautions to prevent such oxidation if pure thorium powder is to be secured. Further purification, if necessary, may be effected by redistilling the thorium chloride in a current of dried carbon dioxide gas or other inert gases.

The next step in the process consists in reducing a halide of one of the metals mentioned by means of an alkaline-earth halide and an alkali metal. A mixture of these three constituents, when heated to the reaction temperature in a vacuum or inert atmosphere, produces the metal desired, leaving, however, certain reaction products mixed with the reduced metal which are subsequently to be isolated therefrom. For the purpose of illustration, calcium chloride will be designated as the representative alkaline-earth halide and sodium as that of an alkali metal.

A suitable quantity of thorium chloride is mixed with sodium which has previously been cut into small pieces, the proportions by weight, being 374 parts of thorium chloride to 138 parts of sodium. To this mixture is also added calcium chloride, the quantity of which should be sufficient to reduce any thorium oxy-chloride which may now be present. I usually assume the presence of 10 to 50% of oxy-chloride depending upon the method of preparation, the size of the sample and the precautions taken.

A mixture comprising the three constituents named, may be compounded within a reaction bomb or subsequently introduced after mixing. The bomb which is to contain the mixture may be a hollow cylinder of steel, the wall thickness of which should be capable of withstanding rather high pressures and may be, for example, ½ of an inch in thickness. The length of a bomb which has been used in experimental work has been 9 inches, with an inside diameter of 2 inches. The bomb is preferably practically filled with the charge so as to exclude as much air as possible. If the bomb has been filled as completely as convenient, the oxygen of the remaining air is too small to be detrimental for the present purpose and the same is true of the nitrogen content of the residual air. If, however, a rather large bomb is used into which a comparatively small quantity of the charge is introduced, leaving an objectionable quantity of air in the bomb, the air may be exhausted through a valve made in the bomb.

After the introduction of the mixture into the bomb, the open end of the latter is closed tightly with a screw plug and sealed, the threads of the plug having previously been smeared with a mixture of magnesia and linseed oil which serves the double purpose of filling the joint made by the threads in the bomb and keeping the iron plug and the bomb from welding together when the latter are heated. The latter function enables the stopper or plug to be easily removed when it is desired to remove the contents of the bomb.

The bomb, with its contents, is then heated in any desired manner; in performing this operation, a gas furnace has been satisfactorily employed. In heating the bomb with its contents, it is preferable to bring the temperature up very slowly allowing one or two hours for the temperature of the bomb to reach a bright red heat, after which the temperature should be maintained for about 1 hour at a temperature as high as may be, without having the sodium vapor forced out of the bomb. During this heating process, if it happen that the iron bomb and the stopper do not form a sufficiently tight joint, the sodium vapor will be seen to burn at the threads if the temperature reached is near the boiling point of sodium. If the sodium is forced out to only a small extent, the fissure may be effectively sealed by placing thereon some sodium chloride, which, upon melting, fills the fissure.

The bomb, having been heated to the reaction temperature of its charge, it is allowed to cool, whence it is found that the thorium chloride has been reduced to thorium and that thorium oxy-chloride has also been reduced by means of calcium chloride and sodium, these two reactions, respectively, being illustrated by the following equations.

$$ThCl_4 + 4Na = 4NaCl + Th.$$
$$ThOCl_2 + CaCl_2 + 4Na = Th + 4NaCl + CaO.$$

The bomb having been allowed to cool, the products of the reaction, which are found to be a hard mass, are chiseled out from the inside of the bomb. Small pieces, as chipped from the mass, are placed, one at a time, into cold alcohol so that the sodium may be allowed to react with the alcohol at such rate that the latter does not become too hot, whereby the burning of the hydrogen and the alcohol is avoided.

The use of alcohol for removing the sodium is preferred to water, inasmuch as reaction between sodium and water is so violent that the reaction may be dangerous to the operator unless the reaction is excessively slow. The alcohol and the reaction products are now transferred into a large vessel having a considerable volume of water; for example, 10 to 20 liters for a charge containing 100 grams of thorium powder. At this point, the thorium powder, together with any thorium hydroxide which may have been formed and such salt as may be undissolved, is allowed to settle, after which the supernatant liquid is decanted or siphoned away. The thorium is then washed about three times with water by simple decantation, after which the total volume of the thorium powder and the liquor is about 200 to 500 cc. The metal powder and liquor is then acidified which may be accomplished by adding about 200 cc. of 1 to 1 acetic acid, subsequent to which the liquid is thoroughly agitated.

After about 15 to 30 minutes, the supernatant liquid, which may not yet be quite clear, may be decanted off. The residue, which is usually coarse, is washed with water into a porcelain mortar and rubbed up with a pestel to disintegrate lumps for the purpose of exposing all soluble material to subsequent washing so that there may not remain any undissolved particles of material which should be dissolved.

The material from the mortar may then be washed back into a large vessel, and another 200 cc. portion of 1 to 1 acetic acid is added with thorough agitation. This mixture is then diluted to a volume of about 10 liters. The undissolved material is allowed to settle and the supernatant liquid is decanted. This process of washing by acidification, dilution and decantation may be repeated a third time, which is generally sufficient to give very clean thorium powder. After the third washing, the thorium powder is filtered on a Buchner funnel, using the suction pump to hasten the filtration. The thorium powder is then washed thoroughly with distilled water, then with alcohol, followed by a washing with ether, after which air is drawn through the filter long enough to dry the powder to such an extent that it will fall freely from the filter paper upon a sieve when the funnel is inverted over it. The thorium powder, after being deposited on a 200 mesh sieve, is gently brushed through it and quickly placed under alcohol for preservation.

It is to be appreciated that some of the metals mentioned, such, for example, as thorium, uranium and zirconium, while in a fine state of sub-division, should be exposed to the atmosphere and to water for as short a time as possible in order to minimize oxidation and hydration, for, if these two reactions are allowed to occur, a great deal of trouble or even failure may result in subsequently working these metals from the powdered state into a coherent mass, if such process is contemplated.

Further purification of this powder may be made by treating it according to the following process. A quantity of the powder is placed in a shallow evaporating dish or other vessel in which the powder may be spread out in a thin layer. A nonaqueous liquid, such, for example, as methyl alcohol is then added to cover the thorium powder which has been placed in the dish.

According to the process as practiced, it has been found that a quantity of iron resides in the metallic powders at the stage to which they have been brought as thus far described. This iron, which is in the state of fine powder, may be removed by placing one end of a strong electro-magnet beneath the surface of the alcohol and moving it around in intimate contact with the metallic powder. The electro-magnet should be removed occasionally and any iron powder which adheres to it should be released. The use of the electro-magnet should be continued in a manner described until no more iron can be withdrawn by means of the electromagnet.

After the use of the electro-magnet, the thorium powder may be treated according to a method described and claimed in a copending application of J. W. Marden, Serial No. 583,376, filed August 21, 1922, Purification of metal powders (W L 196), and assigned to the Westinghouse Lamp Company, which describes, in general, a method for washing metal powders, but, for the purpose of illustration, may consist, in this instance, of treating the thorium powder with a hydrochloric acid-alcohol wash to remove any oxides, hydroxides or other impurities which may have been formed during the washing of the powder with water. The acid-alcohol wash for this purpose may be made by slowly dropping concentrated hydrochloric acid into concentrated sulphuric acid, passing the hydrogen chloride thus liberated through a drying tube containing calcium chloride and subsequently passing the thoroughly dried hydrogen chloride gas into alcohol. It will thus be seen that this washing solution contains substantially no water, or, in other words, is nonaqueous. This kind of solution is very desirable, as, by its use, the metal powder desired is not subject to hydration or oxidation. The acid-alcohol solution thus made is added to the mixture of alcohol and thorium powder which remains in the evaporating dish after the iron has been removed therefrom. The total mixture now in the evaporating dish is continuously stirred and, if necessary, more of the acid-alcohol mixture may be added gradually in small separate quantities until gas bubbles begin to appear on the surface of the liquid. The appearance of these bubbles is an indication of the evolution of hydrogen arising from the action of hydrochloric acid on the thorium.

The addition of the acid-alcohol wash should therefore be discontinued when hydrogen is evolved, as the removal of the impurities must be accomplished without dissolving any large quantities of the metal itself.

The stirring of the mixture may be continued for a short period of time, say 10 to 15 minutes for 100 grams of thorium powder.

After the powder has been thoroughly treated by the acid-alcohol wash, the mixture is filtered by means of a suction filter as rapidly as possible. During the filtration, care should be taken to keep the thorium covered with alcohol in order to keep the same from the action of the atmosphere. The powder should also be thoroughly washed with alcohol in order to remove all traces of the acid resulting from the acid-alcohol wash.

A method has been described in detail for the production of thorium from its chloride by means of calcium chloride and sodium. The other metals, the production of which this application is concerned with, may, however, be produced from their halides by means of an alkaline earth halide and an alkali metal observing, however, some slight modifications which may be necessary for the production of certain of the metals in order to secure their best results, but these modifications are such as may be made by one skilled in the art.

What is claimed is:

1. The method of producing a metal of the group comprising uranium, thorium, zirconium, titanium, vanadium, tantalum and tungsten which consists in reducing a halide of one of said metals by means of an alkali metal and an alkaline-earth halide.

2. The method of producing a metal of the group comprising thorium, uranium, zirconium, titanium, vanadium, tantalum and tungsten which consists in reducing in an inert environment a halide of one of said metals by means of an alkali metal and an alkaline-earth halide.

3. The method of producing a metal of the group comprising thorium, uranium, zirconium, titanium, vanadium, tantalum and tungsten which consists in heating in an inert environment a mixture comprising a halide of one of said metals, an alkaline-earth halide and an alkali metal.

4. The method of producing a metal of the group comprising thorium, uranium, zirconium, titanium, vanadium, tantalum and tungsten which consists in heating a mixture comprising a halide of one of said metals, an alkaline-earth halide and an alkali metal and excluding oxygen, nitrogen and water vapor from the reaction zone during the progress of the reaction.

5. The process of producing a metal of the group comprising thorium, uranium, zirconium, titanium, vanadium, tantalum and tungsten which consists in reducing a halide of one of said metals with an alkali metal and an alkaline-earth halide and treating the reaction product to eliminate all substances except the metal desired.

6. The method of producing a metal of the group comprising thorium, uranium, zirconium, titanium, vanadium, tantalum and tungsten which consists in mixing a halide of one of said metals, an alkali metal and an alkaline-earth halide, enclosing this mixture in a vessel adapted to exclude the atmosphere and to retain the reaction products, applying heat to the vessel to cause the reaction, cooling the same and treating the reaction products to eliminate all except the metal desired.

7. The method of producing a metal of the group comprising uranium, thorium, zirconium, titanium, vanadium, tantalum and tungsten which consists in mixing a halide of one of said metals with an alkaline-earth halide and an alkali metal, enclosing this mixture in a vessel adapted to exclude the atmosphere, applying heat to said vessel to cause the reaction, cooling said vessel, immersing the reaction products, in alcohol, adding thereto and decanting therefrom, an acidified quantity of water, filtering the undissolved material, covering the filtered material with alcohol, eliminating iron from the metal by means of a magnet, washing the desired metal with a mixture of acid and alcohol and filtering the mixture thus obtained.

8. The method of producing thorium which consists in mixing a halide thereof with an alkali metal and an alkaline-earth halide, enclosing this mixture in a vessel adapted to exclude the atmosphere, applying heat to said vessel to cause the reaction, cooling said vessel, immersing the reaction products in alcohol, adding thereto and decanting therefrom, an acidified quantity of water, filtering the undissolved material, covering the filtering material with alcohol, eliminating iron from a metal by means of a magnet, washing the thorium with a mixture of acid and alcohol and filtering the mixture thus obtained.

9. The method of producing thorium which consists in mixing a halide thereof with an alkali metal and an alkaline-earth halide, enclosing this mixture in a vessel adapted to exclude the atmosphere, applying heat to the vessel to cause the reaction, cooling the same and treating the reaction products to eliminate all except thorium.

10. The method of producing thorium which consists in mixing thorium chloride with sodium and calcium chloride, enclosing this mixture in a vessel adapted to exclude the atmosphere applying heat to said vessel to cause the reaction, cooling the same, immersing the reaction products in alcohol, adding thereto and decanting therefrom, a quantity of water acidified with hydrochloric-acid, filtering the undissolved material, washing the same with a mixture of hydrochloric acid and alcohol to dissolve all materials except thorium and filtering the mixture thus obtained.

In testimony whereof, I have hereunto subscribed my name this 19th day of August 1922.

JOHN WESLEY MARDEN.